United States Patent

[11] 3,593,770

| [72] | Inventor | Donald M. Fraser |
|---|---|---|
|   |   | Sherman Oaks, Calif. |
| [21] | Appl. No | 849,408 |
| [22] | Filed | Aug. 12, 1969 |
| [45] | Patented | July 20, 1971 |
| [73] | Assignee | The United States of America as represented by the Secretary of the Army |

[54] POSITION LOCKING DEVICE FOR A NUT
6 Claims, 7 Drawing Figs.

[52] U.S. Cl. ................................................ 151/2, 285/81
[51] Int. Cl. .................................................... F16b 39/00
[50] Field of Search .......................................... 151/2, 27, 28, 29, 44, 61, 68, 70; 287/130; 285/81, 330

[56] References Cited
UNITED STATES PATENTS

| 1,170,779 | 2/1916 | Norling | 151/2 |
| 1,865,637 | 7/1932 | Lear | 151/2 |
| 1,880,124 | 9/1932 | Elwert | 151/2 |

FOREIGN PATENTS

| 277,780 | 5/1963 | Australia | 285/81 |
| 612,510 | 4/1926 | France | 151/2 |
| 782,322 | 3/1935 | France | 285/81 |
| 881,503 | 1/1943 | France | 151/2 |
| 507,008 | 9/1930 | Germany | 285/81 |

Primary Examiner—Marion Parsons, Jr.
Attorneys—Harry M. Saragovitz, Edward J. Kelly and Herbert Berl ABSTRACT: A position-locking device for a nut in which a flexible steel strip having notches along its opposite edges is wound between the nut and a collar which also are provided with notches in their opposing faces and which mate with the notches in the strip.

PATENTED JUL 20 1971

3,593,770

INVENTOR,
Donald M. Fraser

BY: Harry M. Saragovitz,
Edward J. Kelly & Herbert Berl
ATTORNEYS.

POSITION LOCKING DEVICE FOR A NUT

Nut locks are numerous and consist of ratchets, wires, washers with upstanding tongues etc. Some are rigid and some are deformable. Each type has its own merits. However, all types possess a certain amount of rigidity or strength. Many break, deform upon over tightening the nut; many are incapable of reuse and will be discarded, once used, and their locking strength cannot be increased as desired.

Applicant's nut lock is designed to overcome the aforesaid disadvantages by providing a flexible strip of steel, or other adaptable material, which is notched along its opposite edges. The teeth formed by the notches in the strip mate with notches in the opposing faces of a nut and a collar when the strip is wound between them. The strength of the lock will be regulated by the number of windings made. It is, therefore, a principal object of this invention to provide a nut lock in which the locking strength may be regulated as desired.

Another object is to provide a nut lock made of a flexible strip of steel having notched edges that mate with notched faces of the members to be locked.

A further object is to provide a nut-locking strip that may be coiled for storage and dispensing purposes.

A still further object is to provide a nut lock that is quickly applied or detached.

A final object is to provide a nut locking strip that is capable of reuse.

These and other objects and advantages of the present invention will be fully apparent from the following description when taken in connection with the annexed drawing, in which.

Figure 1:
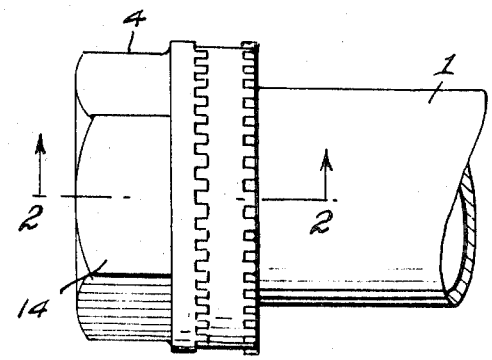
FIG. 1 is a side elevation of the invention as assembled.

Referring to the drawing in which like reference numerals denote like parts throughout the various views, reference character 1 designates a tube, 2 a collar secured on the tube 1 by threads 3, and a nut 4 threaded on collar 2 by threads 5.

Figure 2:
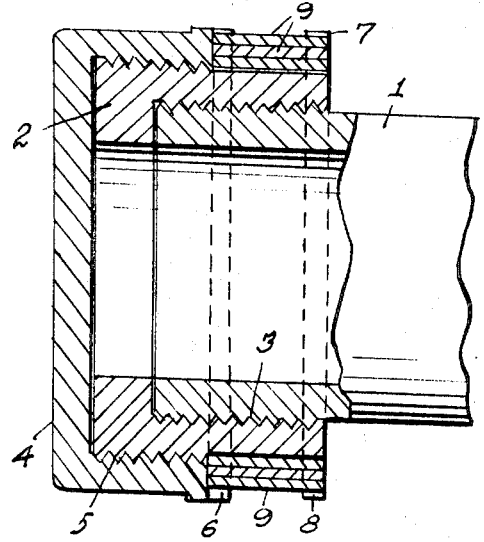
FIG. 2 is an axial section taken along line 2-2 of FIG. 1.
Figure 3:
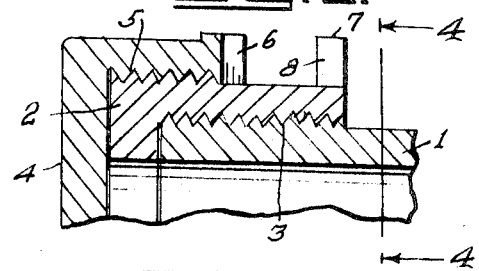
FIG. 3 is a fragmentary sectional view of the nut and collar assembly before applying the locking strip.
Figure 4:
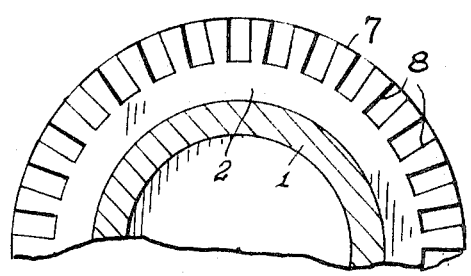
FIG. 4 is a fragmentary section view taken along line 4-4 of FIG. 4.

As shown in FIG. 2, nut 4 is cap shaped and, as best seen in FIG. 3 is provided with symmetrically arranged notches 6 in its inner face.

Collar 2 is provided with an annular flange 7 which is provided with a series of symmetrical notches 8 which are of the same width and depth as notches 6 in nut 4; flange 7 being of the same diameter as the notched end of nut 4.

Figure 5:
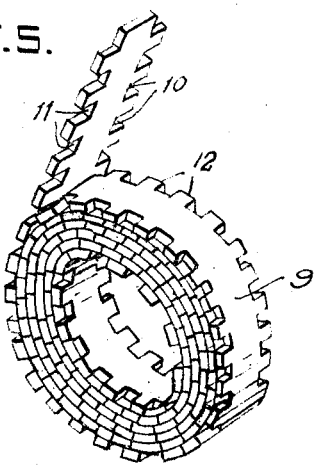
FIG. 5 is a perspective view of a coil of the locking strip.
Figure 6:
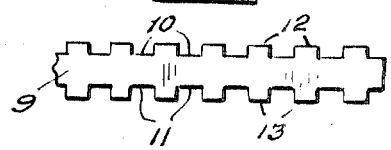
FIG. 6 is a top view of a portion of the locking strip.

A locking strip is designated by 9, and is best seen in FIGS. 5 and 6.

Locking strip 9 in a flat, flexible strip of steel or other adaptable material, and is provided with transversely aligned notches 10 and 11 along its opposite edges.

These notches are of a size to permit teeth 12 and 13 formed by notches 10 and 11 to be received in notches 6 and 8 of nut 4 and flange 7 when the device is assembled.

Nut 4 is shown having a hex head portion 14 for applying a wrench, not shown, or like tool to tighten it on collar 2.

Collar 2 could be welded to tube 1 instead of being threaded as at 3 if desired.

As shown in FIG. 5, the strip 9 may be rolled into a coil for storage or dispensing purposes.

First, the collar 2 is screwed onto tube 4 as seen in FIG. 3. Then nut 4 will be screwed over collar 2 and tightened, at the same time aligning notches 6 with notches 8.

Next, strip 9 is applied between notches 6 and 8 so that teeth 12 and 13 will fall into the notches 6 and 8. It is then wound about collar 2 and the remaining portion of strip 9 is cut off.

In order to prevent strip 9 from unwinding after it has been applied, a final twist on nut 4 will suffice to clamp the ends of strip 9 between flange 7 and nut 4 and secured it tightly therebetween.

One or two windings will usually suffice, but for additional locking strength, more winding can be made, the number of windings being limited only by the depth of notches 6 and 8 and the thickness of strip 9.

Since the strip 9 will be relatively thin, it will be flexible and therefore easily manipulated.

Strip 9 can be made of varying widths for use with nut and flange gaps of different widths. Coils of varying sizes could be stored for use when needed.

Figure 7:
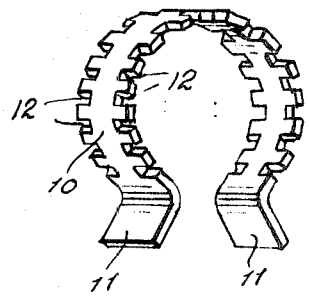
FIG. 7 is a perspective view of a modification.

The means for locking between nut 4 and flange 7 could be in the form of a spring clip 10 as seen in FIG. 7. The clip 10 is semicircular in shape and has outwardly turned ends 11 and notches 12 in its edges. Clip 10 may be quickly snapped over collar 2 and the teeth formed by notches 12 will interlock in notches 6 and 8 in the nut 4 and flange 7, respectively.

While a collar and nut arrangement has been shown, other arrangements could be made, such as a locking between a nut and a washer, a coupling, etc.

While only a preferred form of the invention is shown and described, other forms of the invention are contemplated and numerous changes and modifications may be made therein without departing from the spirit of the invention as set forth in the appended claims.

What I claim is:

1. In a locking device for a nut and including a threaded circular mounting member, upstanding annular flange means positioned on the mounting member, there being a series of notches disposed about the entire circumference of said flange member, an internally threaded cup-shaped nut adapted to be threadably engaged on said mounting member whereby a space is left between said flange and the rim of said nut, there being a series of notches disposed about the entire circumference of said rim an elongated, flat locking strip having notches along its edges and extending its entire length, said notches in said nut, flange member and locking strip being equally spaced whereby when said strip is wound one or more turns around said collar in said space, the teeth formed by said notches in said locking strip will be received in said notches in said nut and flange.

2. A locking device according to claim 1 wherein said mounting member is an internally threaded tubular sleeve for positioning on a cooperating externally threaded post.

3. A device as claimed in claim 1 wherein said notches in said flange are radially disposed and extend to a depth terminating at the outer diameter of said collar.

4. A device as claimed in claim 1 wherein said notches in said nut are radially disposed in the rim thereof and one of the same depth and width as said notches in said flange.

5. A device as claimed in claim 1 wherein said notches in said locking strip are arranged in transversely aligned relation thereon, said notches on both edges thereof extending throughout the entire length of said member.

6. A device as claimed in claim 1 said locking member is flexible.